(12) United States Patent
Chakra et al.

(10) Patent No.: US 8,949,629 B2
(45) Date of Patent: Feb. 3, 2015

(54) PREDICTING BATTERY POWER USAGE

(75) Inventors: Al Chakra, Apex, NC (US); Itzhack Goldberg, Hadera (IL); Liam Harpur, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 13/078,518

(22) Filed: Apr. 1, 2011

(65) Prior Publication Data

US 2012/0254634 A1    Oct. 4, 2012

(51) Int. Cl.
G06F 1/32    (2006.01)
G06F 1/28    (2006.01)

(52) U.S. Cl.
CPC ..................... G06F 1/28 (2013.01)
USPC .......................................... 713/300

(58) Field of Classification Search
USPC .......................................... 713/300
See application file for complete search history.

(56) References Cited

U.S. PATENT DOCUMENTS

| | | | |
|---|---|---|---|
| 6,586,911 B1 * | 7/2003 | Smith et al. | 320/134 |
| 7,191,077 B2 | 3/2007 | Mese et al. | |
| 7,787,405 B2 | 8/2010 | Dettinger et al. | |
| 7,853,813 B2 * | 12/2010 | Lee | 713/320 |
| 8,090,415 B2 * | 1/2012 | Annambhotla et al. | 455/573 |
| 2008/0165714 A1 | 7/2008 | Dettinger et al. | |
| 2008/0201587 A1 | 8/2008 | Lee | |
| 2009/0187780 A1 | 7/2009 | Keohane et al. | |
| 2009/0228725 A1 | 9/2009 | Carroll | |
| 2010/0151918 A1 | 6/2010 | Annambhotla et al. | |
| 2011/0071780 A1 | 3/2011 | Tarkoma | |

FOREIGN PATENT DOCUMENTS

| | | |
|---|---|---|
| CN | 1662870 A | 8/2005 |
| CN | 101611364 A | 12/2009 |
| JP | 2009089325 A | 4/2009 |
| JP | 2009245378 A | 10/2009 |
| WO | 2010068313 | 6/2010 |

* cited by examiner

*Primary Examiner* — Thomas Lee
*Assistant Examiner* — Eric Chang
(74) *Attorney, Agent, or Firm* — Steven L. Nichols; Van Cott, Bagley, Cornwall & McCarthy P.C.

(57) ABSTRACT

A method for predicting battery power usage includes, collecting information relating to battery power consumption due to tasks performed by the physical computing system powered by a battery, and notifying a user in response to a determination that tasks associated with an upcoming event stored in a calendar application of the physical computing system are projected to exhaust the battery. A computing system includes a processor, a memory communicatively coupled to the processor, and a battery to power the computing system. The processor is configured to collect information relating to battery power consumption due to tasks performed by the computing system, and notify a user in response to a determination that tasks associated with an upcoming event stored in a calendar application of the computing system are projected to exhaust the battery.

25 Claims, 5 Drawing Sheets

Day Schedule (300)

| Time | Event | Location |
|---|---|---|
| 7:00 | | |
| 8:00 | Meeting 1 (308) | Rm 402 |
| 9:00 | | |
| 10:00 | Meeting 2 (310) | Rm 105 |
| 11:00 | | |
| 12:00 | | |
| 1:00 | | |
| 2:00 | | |
| 3:00 | Presentation (312) | Client |
| 4:00 | | |
| 5:00 | | |
| 6:00 | | |
| 7:00 | | |

PREDICTING BATTERY POWER USAGE

BACKGROUND

Aspects of the present invention relate in general to battery power management, and more particularly, to methods and systems for providing recommendations to a user based on predicted battery power usage. Many individuals make use of electronic devices such as laptop computers and mobile phones that are primarily powered by a rechargeable battery. The different tasks performed by these electronic devices each consume different amounts of battery power. For example, the various software applications being can by the electronic device will cause the device to consume power differently. Furthermore, different software applications may use different hardware components, each of which consumes a different amount of battery power. For example, a speaker associated with an electronic device may consume more power than the computer processor of that device does generally. Thus, it is difficult to determine whether there is enough battery power for upcoming uses of the device.

BRIEF SUMMARY

A method for predicting battery power usage includes, with a physical computing device capable of being powered by a battery, collecting information relating to battery power consumption due to tasks performed by the physical computing system, and with the physical computing system, notifying a user in response to a determination that tasks associated with an upcoming event stored in a calendar application of the physical computing system are projected to exhaust the battery.

A computing system includes a processor, a memory communicatively coupled to the processor, and a battery to power the computing system. The processor is configured to collect information relating to battery power consumption due to tasks performed by the computing system, and notify a user in response to a determination that tasks associated with an upcoming event stored in a calendar application of the computing system are projected to exhaust the battery.

A computer program product for predicting battery power usage includes a computer readable storage medium having computer readable code embodied therewith. The computer readable program code includes computer readable program code configured to collect information relating to battery power consumption due to tasks performed by a physical computing system running the computer program product, and computer readable program code configured to notify a user in response to a determination that tasks associated with an upcoming event stored in a calendar application of the physical computing system are projected to exhaust the battery.

A method for predicting battery power usage includes, with a physical computing device capable of being powered by a battery, collecting information relating to battery power consumption of tasks performed by the physical computing system during events stored in a calendar application on said physical computing system, determining which of the tasks are used for one of the events, with the physical computing system, determining whether the tasks will exhaust the battery power during the one of the events, and with the physical computing system, notifying a user if the physical computing system will be powered solely by the battery during the event and the tasks are projected to exhaust the battery.

A computing system includes a processor, a memory communicatively coupled to the processor, and a battery to power the computing system. The processor is configured to collect information relating to battery power consumption of tasks performed by the computing system during events stored in a calendar application on said computing system, determine whether the tasks will exhaust the battery power during the one of the events, and notify a user if the computing system will be powered solely by the battery during the event and the tasks are projected to exhaust the battery.

BRIEF DESCRIPTION OF THE SEVERAL VIEWS OF THE DRAWINGS

The accompanying drawings illustrate various embodiments of the principles described herein and are apart of the specification. The illustrated embodiments are merely examples and do not limit the scope of the claims.

Throughout the drawings, identical reference numbers designate similar, but not necessarily identical, elements.

DETAILED DESCRIPTION

As mentioned above, it is often difficult for a user to predict when the battery power of his or her computing device will run out. In light of this and other issues, the present specification discloses methods and systems for predicting battery usage. According to certain illustrative examples, a computing device such as a smart phone or a laptop computer can keep track of how much battery power is consumed for particular tasks that are performed by that device. Additionally, the device can keep track of how the use of these tasks corresponds with events that are stored in a calendar application run by, or accessible to, the computing device.

For example, if a particular event stored in the calendar application is a particular type of presentation meeting which requires the user to display video, then the computing device can determine that that type of meetings involves the particular tasks association with displaying video. These tasks may include the software drivers, hardware video controllers, and display devices that are used to display the video.

With the historical data relating to battery use and the calendar application, the computing device can then project the battery usage for upcoming events stored within the calendar application. For example, for an upcoming event, the computing system can determine that the tasks associated with that event will exhaust the battery if the computing device is powered solely by battery during that event. The computing system can then notify the user and suggest to the user a possible means of remedying the situation. For example, the computing system may remind the user to bring a charger, power cord or additional battery. Additionally or alternatively, the computing system can remind the user to fully charge the battery before the event, if doing so will provide enough battery power throughout the event.

Through use of methods and systems embodying principles described herein, a user can be notified if his or her computing device will run out of battery power during an upcoming event listed in an associated calendar application. This prevents situations where the user is unable to get through such an event without losing the functionality of his or her computing device.

As will be appreciated by one skilled in the art, aspects of the present invention may be embodied as a system, method or computer program product. Accordingly, aspects of the present invention may take the form of an entirety hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the term "calendar application" refers to any application or feature of an application that provides the user with a means of managing his or her schedule. A calendar application will typically accept event entries which may indicate a time, date, place, purpose, agenda and possibly other details for a particular event.

Figure 1:
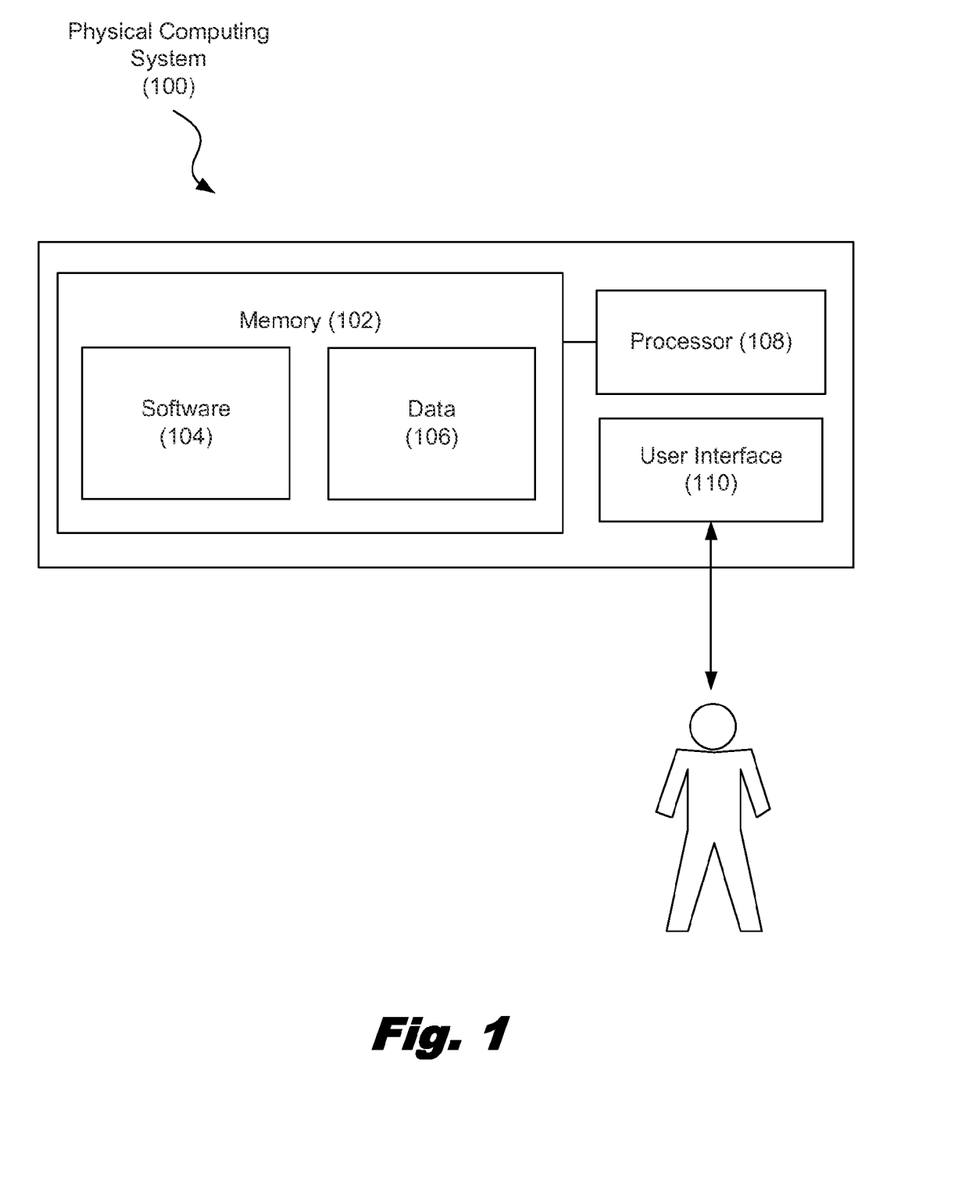
FIG. 1 is a diagram showing an illustrative physical computing system, according to one example of principles described herein.

Referring now to the figures, FIG. 1 is a diagram showing an illustrative physical computing system (100). According to certain illustrative examples, the physical computing system (100) includes a memory (102) having software (104) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical computing system (100) also includes a processor (108) for executing the software (104) and using or updating the data (106) stored in memory (102). The software (104) may include an operating system. An operating system allows other applications to interact properly with the hardware of the mobile computing system. The other applications may include a calendar application and a battery usage prediction application.

A user interface (110) may provide a means for the user (112) to interact with the physical computing system (100).

The user interface may include any collection of devices for interfacing with a human user (112). For example, the user interface (110) may include an input device such as a keyboard or mouse and an output device such as a monitor.

A physical computing system (100) as described herein refers to any computing system that is capable of being powered by battery and includes the ability to provide the user with a calendar application. These types of devices may include, but are not limited to, laptop computers, tablet computers, mobile phones, and Personal Digital Assistants (PDAs).

Figure 2:
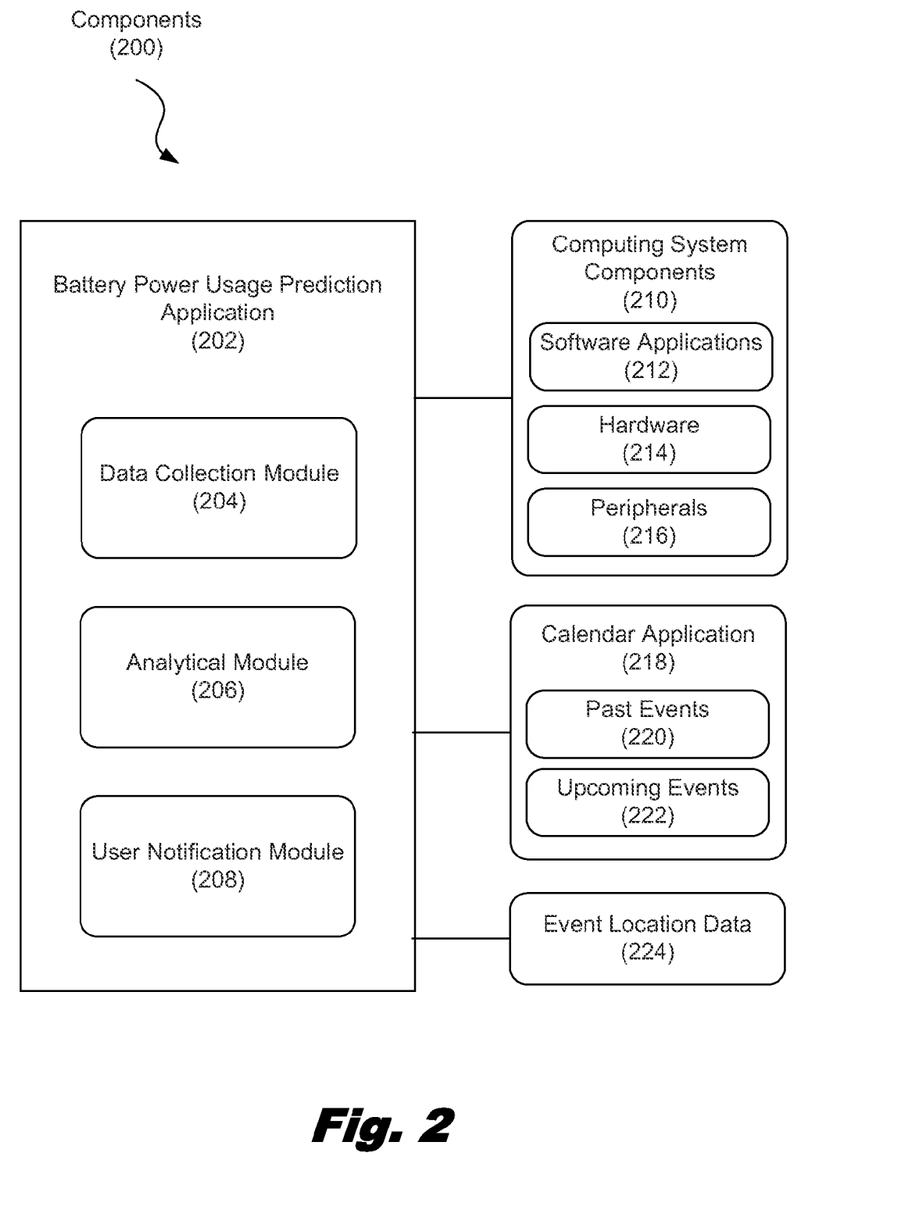
FIG. 2 is a block diagram showing components of a predictive battery power usage application, according to one example of principles described herein.

FIG. 2 is a block diagram showing components (200) of a battery power usage prediction application (202). According to certain illustrative examples, the battery power usage prediction application (202) includes a data collection module (204), an analytical module (206), and a user notification module (208). The following will describe the functions of each of these modules.

The data collection module (204) allows the battery power usage prediction application (202) to obtain data from a variety of sources. Specifically, the data collection module may obtain data from the computing system components (210), a calendar application (218), and event location data (224). The data collection module (204) may then place the obtained data in a format that is ready to be analyzed by the analytical module (206).

The analytical module (206) takes the obtained data and compares the use of computing system tasks with past events (220) stored in the calendar application (218). The analytical module (206) can then determine which types of meetings involve the use of particular types of computing system tasks and computing system components (210).

For example, the analytical module may notice that during a particular type of past event, a presentation application was almost always used. Thus, for future events of the same type, it may be assumed that the same presentation application will be used, for example a slideshow application.

Additionally, the same application may consume power differently in some types of meetings than others. Thus, the analytical module (206) can determine how a particular application consumed battery power for a particular type of previous event.

The analytical module (206) can then examine upcoming events (222) within the calendar application and determine which tasks are likely to be used for those upcoming events (222). The analytical module (206) can also consider the projected or scheduled length of the upcoming event (222) so as to estimate the battery power needed for the tasks associated with the event over the projected length of the event.

The analyzing process may be done immediately after the user makes an event entry into the calendar application. If the power usage for the upcoming event is projected to completely exhaust a fully charged battery during the scheduled event, then it can be determined immediately that the battery will be exhausted during that event despite the battery power level at the start of the event. The user is notified by the user notification module (208) that battery power alone is not projected to support use of the computing device during the scheduled event.

If the power usage for the event is not projected to exhaust a fully charged battery, then the system may check the battery power level at a predetermined amount of time before the event. If the currently available battery power is less than the projected battery power usage for the upcoming event, then the battery power usage prediction application (202) can project that the battery power will be exhausted during that event.

In response to a determination that the battery power will likely be exhausted during an upcoming event, the user notification module (208) can notify the user. If an event is projected to exhaust a fully charged battery, then the user may be notified upon creation of a calendar application entry for that event as well as right before that event. If an event is projected to exhaust less than a fully charged battery, the battery power usage prediction application (202) may only notify the user right before the event if it is determined that the currently available power is less than the battery power that is projected to be consumed during the event. Additionally or alternatively, the user notification module (208) may notify the user to fully charge the battery prior to the scheduled event, this notification being issued with sufficient time to fully charge the battery before the scheduled event.

In any of these various instances, a user may be notified of the output from the power usage production application (202), for example, by displaying a window to the user with a message that informs the user of the situation. This window may be associated with either the calendar application (218), the batter power usage prediction application (202), or any other appropriate application. In some cases, the battery power usage prediction application (202) may be integrated with the calendar application (218). The user may then take any appropriate steps to prevent the exhaustion of the battery during the upcoming event (222).

The various tasks performed by a computing system will have a varying effect on battery usage based on several computing system components. These components include software applications (212), usage of hardware (214), and powering of peripherals (216). For example, several components of the computing system are used to display a video. A software application (212) is typically used to display video files of a particular format. Additionally, a specific piece of hardware (214) referred to as a video graphics card is typically employed to process the video file data and display it on a display device such as a screen. Furthermore, various peripherals (216) such as speakers or projectors may be used to display the video and project the audio associated with that video. Each of these components consumes battery power. Thus, by looking at the tasks that are expected to be performed during an upcoming event (222), the battery power usage prediction application (202) can get a better estimate of how much battery power will be required for a particular event.

In some cases, the battery power usage prediction application (202) may access event location data (224) when determining whether an upcoming event is likely to exhaust the battery and how to provide power to the computing device throughout the event. Event location data (224) may include information about what type of alternative power sources will be available at particular locations. For example, if an upcoming event (222) is in a particular room, and the event location data (224) indicates that there are several electrical outlets in that room, then the system can remind the user to bring a power adapter to the event if the battery would otherwise run out of power. Alternatively, if there are no electrical outlets at the location where the upcoming event (222) is to be held, and the battery is not projected to last the entire time, then the system can suggest that the user find an alternate means of presentation such as printing out any documentation.

Event location data (224) may be available from an external source such as a server associated with a particular organization. For example, employees of an organization may all be given access to event location data (224) for the facilities. This data may include information such as what peripherals are available in which rooms. Additionally, the data may include information about the availability of electrical outlets or other power sources that may power the computing device during the event. Thus, when an event involves these facilities, the battery power usage prediction application (202) may access the event location data (224) from the server that stores that data.

Additionally, the event location data (224) may also include data such as what peripherals are available in the room. For example, if the computing system is to be used for a video presentation at an upcoming event, then the system can determine which peripherals are available in that room. The determination of the video presentation usage for the upcoming event may have been determined from the past event history by the analytical module (206). If a particular room is equipped with independently powered speakers and a projector, then the computing system may not need to power its internal speakers or its own screen when performing some tasks. Thus, the computing system will consume less power during the event and may not exhaust the battery.

Figure 3:
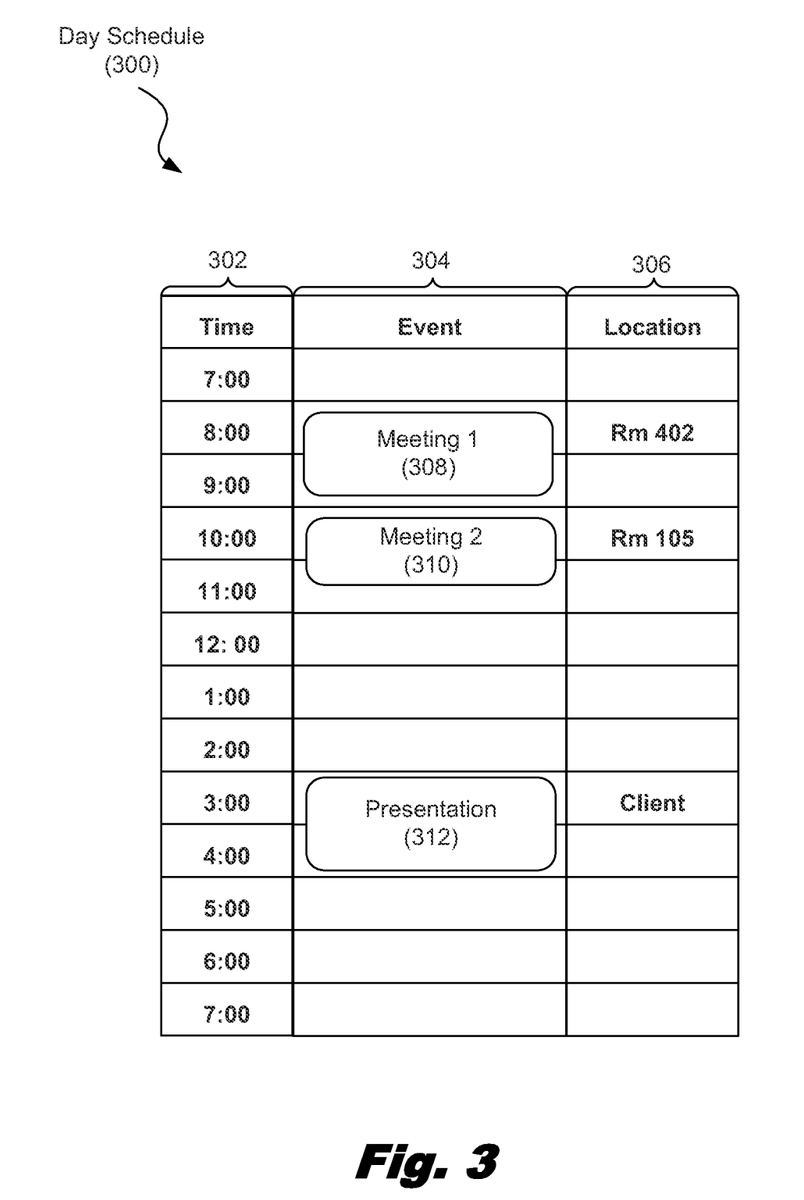
FIG. 3 is a diagram showing an illustrative day schedule of a calendar application, according to one example of principles described herein.

FIG. 3 is a diagram showing an illustrative day schedule (300) of a calendar application. According to certain illustrative examples, the day schedule (300) includes a time column (302), an event column (304), and a location column (306). The time column (302) shows a typical 12-hour day schedule. Several events (308, 310, 312) are shown throughout the day and are associated with particular locations.

In the example illustrated in FIG. 3, two meetings (308, 310) are shown back to back ranging from 8:00 AM to 11:30: AM. According to certain illustrative examples, if the tasks associated with these two meetings (308, 310) are such that the battery power is projected to be exhausted, then the user may be notified. It may be that the computing device is able to make it through the first meeting (308) without running out of battery power. However, the battery power may not be projected to last throughout the second meeting. Therefore, the user will be notified of this situation. Alternatively, it may be the case that Room 402 is equipped with electrical outlets and Room 105, where meeting 2 (310) will be held, is not equipped with electrical outlets. Therefore, the computing system may suggest to the user to charge the battery during the first meeting (308).

In some cases, when a user makes an entry for a calendar application he or she may specify which tasks are expected to be used during that event. Thus, although the analytical module can determine which tasks are likely to be used for a particular type of event. The user may make manually adjustments in case of special circumstances. For example, the user may indicate in the event entry that he or she will be making a different type of presentation then normal during the upcoming meeting which will require the use of different applications. This may affect the projected battery power usage because different applications or different uses of the same application will consume the battery power at different rates.

In the example illustrated in FIG. 3, a presentation event (312) is shown in the afternoon. This event is scheduled to be held at a client's location. In this case, the event location data 224, FIG. 2) may be unknown. If the battery power is projected to be exhausted during the event, then the system may suggest to the user to bring an alternate form of presentation such as printed documentation. This will allow the user to be prepared for the event that electrical outlets are not available at the event location.

Figure 4:
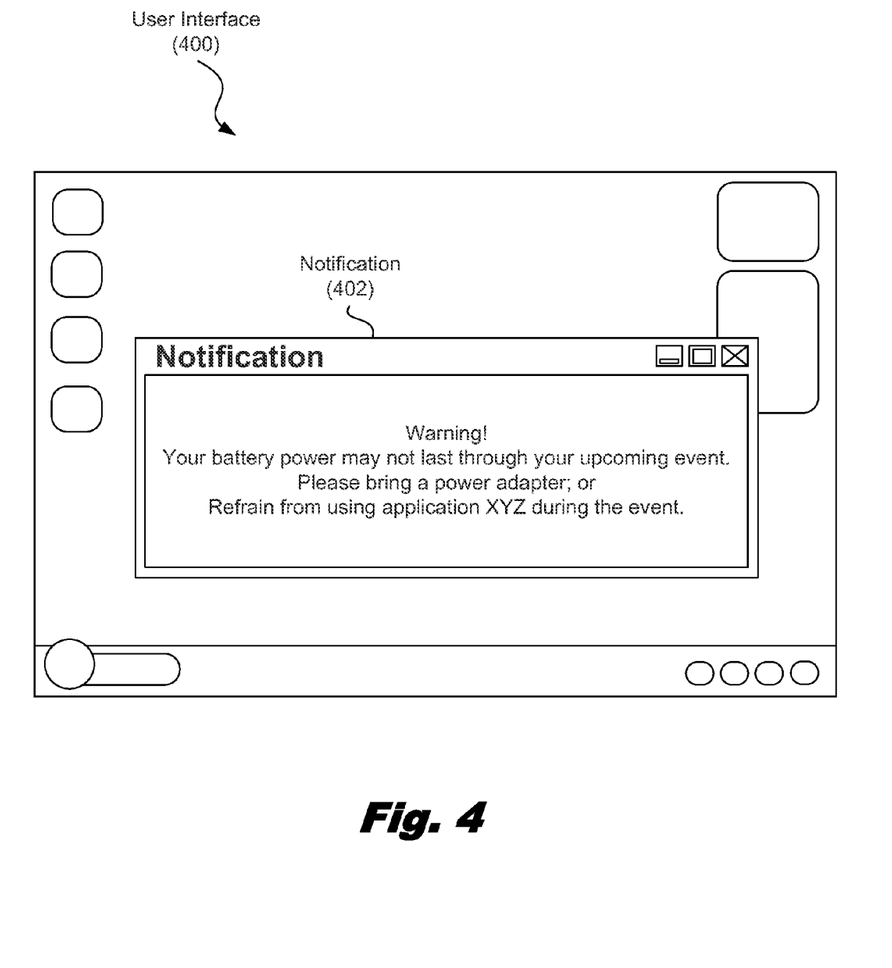
FIG. 4 is a diagram showing an illustrative user interface, according to one example of principles described herein.

FIG. 4 is a diagram showing an illustrative user interface (400). According to certain illustrative examples, the user interface (400) of the computing system running the battery power usage prediction application may provide pop-up notifications (402) to the user. These notifications may warn the user that the battery power will not last throughout an upcoming event. Additionally, the notification may include recommended steps to remedy the situation. For example, if the battery is currently less than fully charged, and a fully charged battery would be sufficient to last throughout the entire upcoming event, then the system may suggest that the user charge the battery beforehand. Alternatively, if electrical outlets are available at the location associated with the upcoming event, then the notification (202) may remind the user to bring a power adapter.

In some cases, the battery power may be able to last throughout the entire event if a particular software application is not run or if a particular piece of hardware is not used. For example, a user may regularly run a particular application that is not essential for the event. This application may consume enough battery power so as to exhaust that battery power during the event.

The user may be notified at the creation of an event entry that refraining from use of particular non-essential applications may allow the battery to last throughout the event without exhausting the battery. Non-essential applications are those which the user may typically run on his or her computing device but are not used for a particular event. For example, a user may have an internet radio application running in the background that is simply muted during presentations. Thus, it still consumes battery power because the music must be processed by the computing system. The analytical module can determine which applications are typically run but not used during particular types of events. When the user schedules such an event, he or she may be reminded to not use the unnecessary application. Additionally or alternatively, the user may receive such a reminder shortly before the event.

Some software applications which are essential for a particular type of event may use more battery power than others by extensively using the hard drive or other power consuming devices. Furthermore, a particular software application may consume a different amount of battery power during different types of events. Particularly, the use of presentation software may be minimal in one type of event but greater in a different type of event even though both events use that same presentation software.

For example, in a first type of event, the presentations may involve simple text displays. In a second type of event, the presentations may regularly involve more processor intensive aspects such as video and sounds. Video and sound components of the presentation may also require more accesses to the hard drive. The increased usage of both the processor and the hard drive will consume more battery power. Thus, the same application may consume the battery power differently based on the tasks performed by that application. By associating the battery usage due to particular applications associated with particular types of events, the battery usage prediction application is better able to predict the battery usage of upcoming events.

Additionally, certain hardware devices such as a wireless interact card may unnecessarily consume battery power. If the user does not need to access the interact or cannot access the internet through a wireless connection anyway for a particular event, then the user may disable the wireless networking device throughout the duration of the event.

The battery power usage application may notify a user that turning off an unnecessary piece of hardware will make it so the battery power is less likely to be exhausted during the event. In some cases, the battery power usage application may interface with the operating system and automatically disable these hardware components. If the user does end up needing these hardware components, then these components can be enabled by the operating system in response to an attempt by the user to use those components, in some cases, the system may prompt the user at the time the event entry is created to determine whether or not the unnecessary hardware components should be disabled. Additionally or alternatively, the user may be prompted regarding the disabling of unnecessary hardware components shortly before the event.

As mentioned above, other devices besides laptop computers may embody principles described herein. For example, if a calendar application on a mobile smart phone indicates that the user will be at a particular location with low signal reception for an upcoming event, then the mobile phone can remind the user to charge the phone before the event. This is because low signal reception areas require the mobile phone to amplify the weaker signals that are received, thus consuming more battery power.

Figure 5:
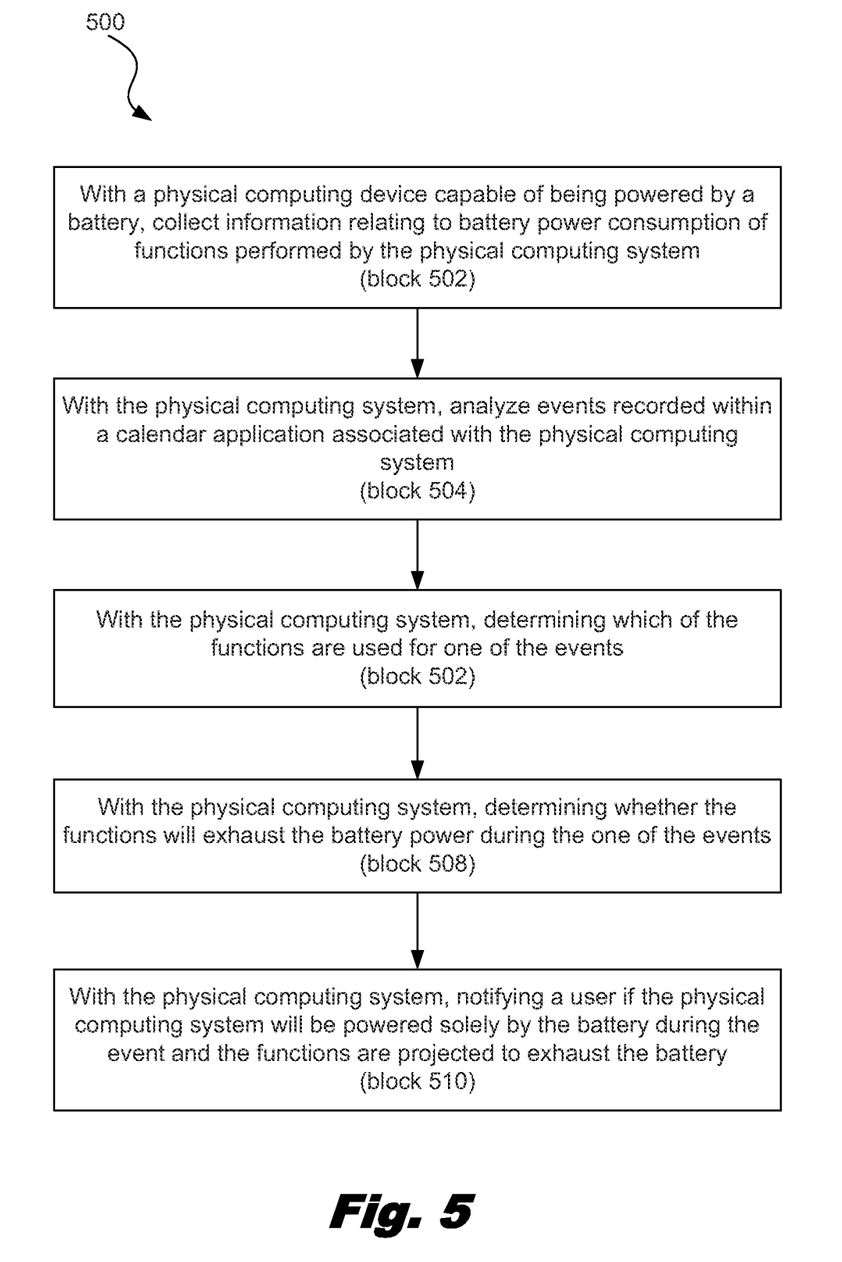
FIG. 5 is a flowchart showing an illustrative method for predicting battery power usage, according to one example of principles described herein.

FIG. 5 is a flowchart showing an illustrative method for predicting battery power usage. According to certain illustrative examples, the method includes, with a physical computing device capable of being powered by a battery, collecting (block 502) information relating to battery power consumption of functions performed by the physical computing system, analyzing (block 504) events stored within a calendar application associated with the physical computing system, determining (block 506) which of the functions are used for one of the events, determining (block 508) whether the functions will exhaust the battery power during the one of the events, and notifying (block 510) a user if the physical computing system will be powered solely by the battery during the event and the functions are projected to exhaust the battery.

The flowchart, and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for predicting battery power usage, the method comprising:
with a physical computing system powered by a battery, collecting information relating to battery power consumption due to tasks performed by said physical computing system during specific past events; and
with said physical computing system, notifying a user in response to a determination that tasks associated with an upcoming event stored in a calendar application of said physical computing system, that is of a type matching said specific past events, are projected to exhaust said battery based on said collected battery power consumption information associated with said specific past events of a type matching said upcoming event.

2. The method of claim 1, wherein said projection of whether said upcoming event will exhaust said battery is performed as soon as an entry for said upcoming event is created in said calendar application.

3. The method of claim 1, wherein said projection is further based in part on conditions associated with a location of said event.

4. The method of claim 3, wherein said conditions comprise availability of independently powered peripheral devices.

5. The method of claim 1, wherein said notifying further comprises notice to discontinue running a number of non-essential software applications or specific pieces of hardware to conserve battery power during said upcoming event.

6. The method of claim 1, wherein notifying said user comprises reminding said user to bring a charging device for said physical computing system to said event.

7. The method of claim 1, wherein an entry for said upcoming event in said calendar system comprises user specification of tasks needing battery power that are expected to be used during that upcoming event.

8. The method of claim 1, wherein notifying said user comprises suggesting to said user to use an alternate method of presentation for said event if said event comprises a presentation.

9. The method of claim 1, wherein said event comprises a plurality of back-to-back events, the combination of said events being projected to exhaust said battery.

10. A computing system comprising:
a processor;
a memory communicatively coupled to said processor; and
a battery to power said computing system;
in which said processor is configured to:
collect information relating to battery power consumption due to tasks performed by said computing system; and notify a user in response to a determination that tasks associated with an upcoming event stored in a calendar application of said computing system are projected to exhaust said battery, and recommend that a number of specific applications or hardware components not needed for said upcoming event be shut down to conserve battery power during said upcoming event.

11. The system of claim 10, wherein said information relating to battery power consumption due to said tasks is correlated with past events stored in said calendar application.

12. The system of claim 10, wherein said tasks comprise at least one of: running software applications, using specific pieces of hardware, and powering peripheral devices.

13. The system of claim 10, wherein to notify said user, said processor is configured to at least one of: remind said user to bring a charging device for said physical computing system to said event and remind said user to fully charge said battery before said event.

14. The system of claim 10, wherein said tasks associated with said event are determined by at least one of: historical data from past events and user specification.

15. The system of claim 10, wherein to notify said user, said processor is configured to suggest to said user to use an alternate method of presentation for said event if said event comprises a presentation.

16. The system of claim 10, wherein said event comprises a plurality of back-to-back events, the combination of said events being projected to exhaust said battery.

17. A computer program product for predicting battery power usage, said computer program product comprising:
a non-transitory computer readable storage medium having computer readable code embodied therewith, said computer readable program code comprising:
computer readable program code configured to collect information relating to battery power consumption due to tasks performed by a physical computing system running said computer program product; and
computer readable program code configured to notify a user in response to a determination that tasks associated with an upcoming event stored in a calendar application of said physical computing system are projected to exhaust said battery,
wherein an entry for said upcoming event in said calendar application comprises an indication, entered by a user creating said entry, of the tasks associated with said upcoming event, said computer readable program code using said indication entered by said user to determine whether the tasks associated with said upcoming event are projected to exhaust said battery.

18. The computer program product of claim 17, wherein said determination is further based in part on conditions associated with a location of said event.

19. The computer program product of claim 18, wherein said conditions comprise at least one of: availability of alternative power sources and availability of independently powered peripheral devices.

20. The computer program product of claim 17, wherein said tasks comprise at least one of: running software applications, using specific pieces of hardware, and powering peripheral devices.

21. The computer program product of claim 17, wherein to notify said user, said computer readable program code is configured to at least one of: remind said user to bring a charging device for said physical computing system to said event and remind said user to fully charge said battery before said event.

22. The computer program product of claim 17, wherein to notify said user, said computer readable program code is configured to suggest to said user to use an alternate method of presentation for said event if said event comprises a presentation.

23. The computer program product of claim 17, wherein said event comprises a plurality of back-to-back events, the combination of said events being projected to exhaust said battery.

24. A method for predicting battery power usage, the method comprising:
with a physical computing device powered by a battery, collecting information relating to battery power consumption of tasks performed by said physical computing system during events stored in a calendar application of said physical computing system;
with said physical computing system, determining which of said tasks are to be used in an upcoming event in said calendar application;
with said physical computing system, at a predetermined time before said upcoming event, determining whether said tasks associated with said upcoming event exhaust said battery during said upcoming event based on a level of battery power in said battery at said predetermined time; and
with said physical computing system, notifying a user if said determination indicates that said tasks associated with said upcoming event are projected to exhaust said battery during said upcoming event.

25. A computing system comprising:
a processor;
a memory communicatively coupled to said processor; and
a battery to power said computing system;
in which said processor is configured to:
collect information relating to battery power consumption of tasks performed by said computing system during events stored in a calendar application on said computing system;
determine which of said tasks are used for an upcoming event in said calendar application;
determine whether said tasks will exhaust said battery during said upcoming event considering independently powered peripherals available at a location of said upcoming event that can be used to reduce demands of said computing system on said battery to perform said tasks during said upcoming event; and
notify a user if said determination indicates that said tasks associated with said upcoming event are projected to exhaust said battery.

* * * * *